Feb. 24, 1931.  F. M. SCHULER  1,793,752
CHERRY AND NUT DROPPING APPARATUS
Filed June 6, 1927  2 Sheets-Sheet 1
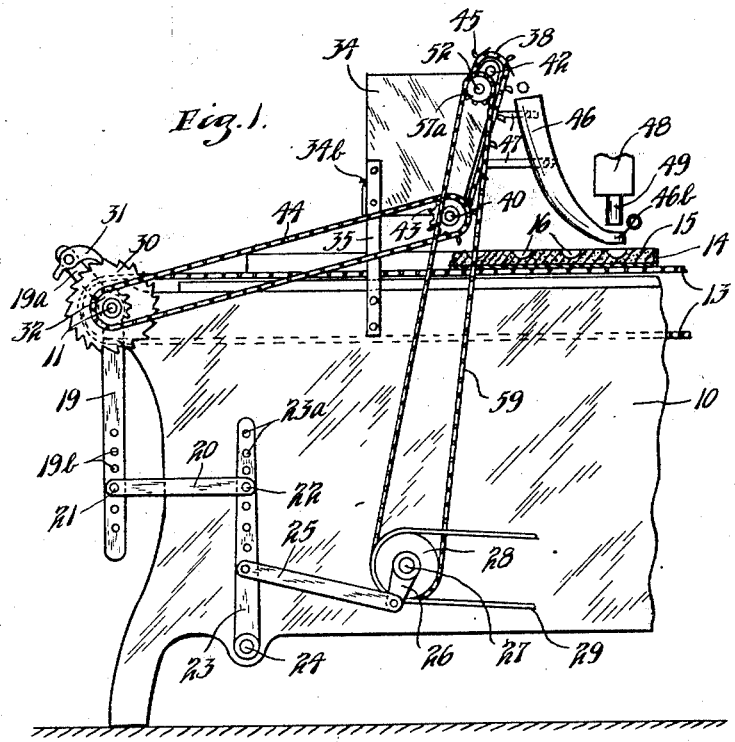
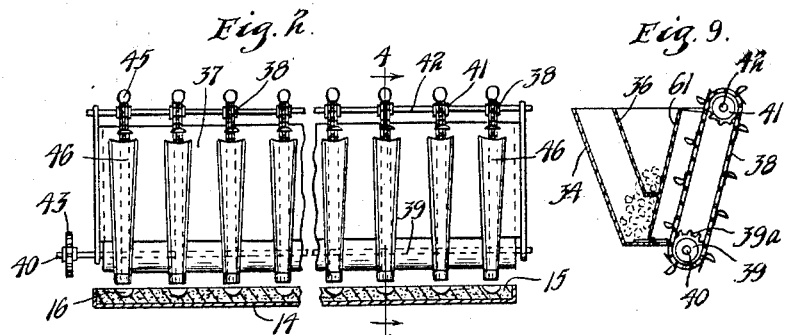
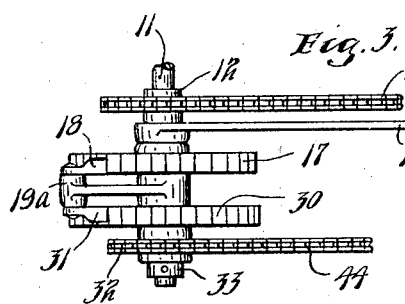
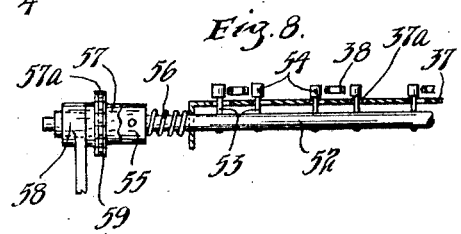
INVENTOR.
FRANK M. SCHULER.
BY HIS ATTORNEYS Feb. 24, 1931. F. M. SCHULER 1,793,752
CHERRY AND NUT DROPPING APPARATUS
Filed June 6, 1927 2 Sheets-Sheet 2
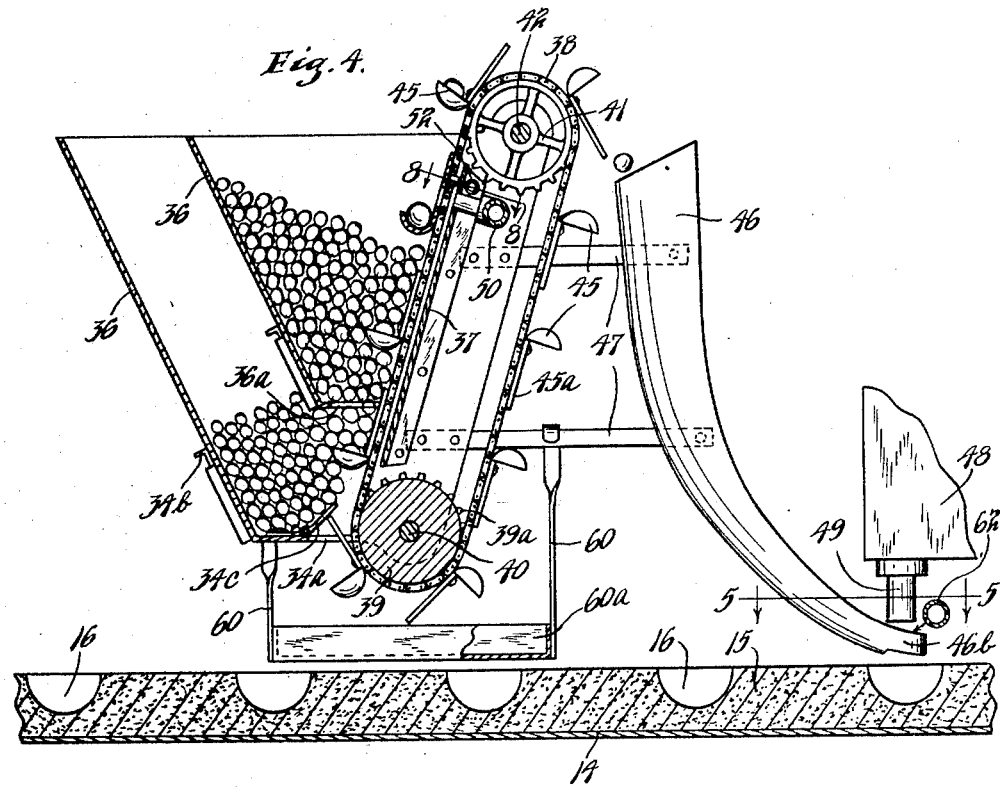
INVENTOR.
FRANK M. SCHULER.
BY HIS ATTORNEYS.

Patented Feb. 24, 1931

1,793,752

UNITED STATES PATENT OFFICE

FRANK M. SCHULER, OF WINONA, MINNESOTA

CHERRY AND NUT DROPPING APPARATUS

Application filed June 6, 1927. Serial No. 196,905.

This invention relates to candy making apparatus and particularly to a feeding means for depositing cherries, nuts and similar articles in the candy. A great deal of candy is now made in starch molds. The starch is contained in shallow trays and the molds or depressions are made in the starch by suitable plungers or patterns. The candy material is then deposited in these molds. A great deal of candy is thus made in machines, the starch trays or trays containing the molds being intermittently advanced on a conveyor to have the different materials deposited in the molds. It is sometimes desired to drop cherries, nuts or other articles into the molds before a charge of fondant or candy material is placed therein and it is often desired to deposit the cherries or nuts in the molds after the candy material has been deposited therein. It is also desirable to have some feeding means which will singly select cherries or nuts from a mass thereof and deliver the same to the molds, one row of the molds or depressions being supplied preferably at one time.

It is an object of this invention, therefore, to provide a simple, efficient and accurate means for singly selecting cherries, nuts or similar articles from a mass and delivering the same to a row of starch molds.

It is a further object of the invention to provide a cherry or nut feeding apparatus comprising a pair of hoppers adapted to contain cherries or nuts, having openings in their bottoms through which are movable endless members or chains carrying cherry or nut receiving members or cups adapted to singly receive and carry the cherries or nuts and deliver the same to a discharging apparatus.

It is a further object of the invention to provide such a feeding apparatus as set forth in the preceding paragraph, in which a fluid under pressure is blown over said members or cups to remove therefrom any surplus of the cherries or nuts.

It is still another object of the invention to provide such an apparatus as set forth in the preceding paragraph, save one, together with means for vibrating said chains or endless members and said cups to remove any surplus of cherries or nuts therefrom.

It is also an object of the invention to provide in combination with a mechanism for advancing starch trays having molds therein and a depositing apparatus for depositing candy material in said molds, a feeding apparatus adapted to receive cherries or nuts from the mass thereof, having a discharge apparatus with its discharge apertures alined with the discharge apertures of said depositing apparatus.

These and other objects and advantages of the invention will be fully set forth in the following description made in connection with the accompanying drawings, in which like reference characters refer to similar parts throughout the several views and in which:—

Fig. 1 is a view in side elevation of the apparatus, a starch tray being shown in section;

Fig. 2 is a partial view in side elevation as seen from the right of Fig. 1;

Fig. 3 is a partial plan view of the driving mechanism shown in Fig. 1;

Fig. 4 is a view in vertical section taken substantially on line 4—4 of Fig. 2, as indicated by the arrows;

Fig. 5 is a horizontal section taken on line 5—5 of Fig. 4;

Fig. 6 is a horizontal section taken on line 6—6 of Fig. 7;

Fig. 7 is a vertical section taken on line 7—7 of Fig. 6;

Fig. 8 is a view partly in plan and partly in horizontal section substantially on line 8—8 of Fig. 4; and Fig. 9 is a small sectional view similar to Fig. 4 showing the use of the cut-out for the chains.

Referring to the drawings, a candy making machine is shown having the frame portion 10 at one end of which is journaled a shaft 11 having thereon sprockets 12 of which only one is shown, over which run the chains 13 forming a conveyor adapted to support and progress trays 14 containing starch 15 in which are formed the molds or depressions 16. The conveyor 13 is intermittently advanced by an intermittent rotation of sprockets 12 which is accomplished by ratchet wheel 17 actuated by a pawl 18 pivotally carried on an arm 19a of a bell crank lever 19 pivoted on shaft 11 and extending downwardly therefrom, said lever having a plurality of holes 19b thereon, to any one of which the end of a link 20 is adapted to be connected by means of a pin 21. The other end of link 20 is adapted to be pivotally connected by a pin 22 to any one, save one, of a plurality of holes 23a in an arm 23 pivoted on a pinion 24 carried in the frame 10. A link 25 is provided, one end of which is adapted to be pivotally connected to one of the holes 23a of an arm 23, and the other end of which is pivotally connected to a crank arm 26 carried on a shaft 27 to which is secured a pulley 28 driven by a suitable belt 29 which will also run over a pulley at some other part of the machine.

Another ratchet wheel 30 is journaled on shaft 11 and adapted to be driven by a pawl 31 also pivotally carried in arm 19a of the crank 19. The ratchet wheel 30 has a sprocket 32 secured thereto and is held on the shaft 11 between crank 19 and collar 33 pinned to said shaft. A hopper 34 is provided, supported from frame 11 by bars 35, which hopper extends across the conveyor 13 and the trays 14. Said hopper has a series of openings 34a in the bottom thereof and is also equipped at its outer side with a slide door 34b through which it may be emptied. The openings 34a are each provided with hinged covers or valves 34c. Another hopper 36 is provided, disposed within the hopper 34 and is shown as of similar shape thereto, which hopper 36 also has a series of openings 36a in the bottom thereof above the openings 34a. The plate 37 forms one side of said hoppers and a plurality of endless chains 38 have one run thereof extending through the openings 34a and 36a and through the hoppers adjacent the plate 37, said chains at their lower ends running over sprocket teeth 39a formed on a roll 39 carried on a shaft 40 having bearings at the sides of the hopper 34. The chains at their upper ends run over sprockets 41 carried on a shaft 42 also extending across hopper 34 and journaled in the sides thereof. The shaft 40 is driven by a sprocket 43 secured to one end thereof over which runs a chain 44 also running over the sprocket 32. The chains 38 have secured thereto a plurality of spaced cups 45 having side portions 45a extending therefrom, which cups are substantially semi-spherical in shape and have their inner sides knurled or roughened as shown at 45b. The plates 45a have openings 45c extending therethrough for a purpose to be later described. There will be a plurality of the chains 38 disposed in spaced relation across the hopper and in one embodiment of the invention, twenty of these chains are used. A plurality of chutes 46 are provided, disposed at one side of the hoppers 34 and 36 and the chains 38, which chutes are arranged respectively in alinement with said chains. The chutes 46 are supported by the bars 47 secured thereto and to the hopper 34 and as shown in Fig. 5, these chutes are of flat trough-shape, being substantially semi-cylindrical at their closed sides. The chutes extend downwardly and forwardly in curved form and have discharge openings 46a at their lower ends, the sides of the chutes being extended around the discharge opening as shown at 46b in a substantially semi-cylindrical loop. The candy making machine comprising frame 10 and conveyor 13 includes a depositing apparatus 48 adapted to deposit candy material such as fondant through a plurality of discharge means or spouts 49, which spouts are arranged in a row extending across the starch trays 14 so that they will aline with the starch molds 16. In the present invention, the discharge openings 46a of the chutes 46 are in vertical alinement with the spouts 49.

It is desired that the cups 45 select only one cherry or other article from the hoppers. As the cups pass through the mass of articles in the hoppers, they are apt to retain more than one of the same. To remove the surplus of articles on the cups 45, an air pipe 50 is provided extending transversely between the runs of chains 38 and having outlet branches 51 extending through the plate 37. Air is forced through pipes 50 and 51 and a blast of air thus passes through the openings 45c in the pipes 45 as they pass the outlet pipes 51 so that any surplus articles will be removed from the cups 45. To further insure that the surplus of articles will be removed from the cups 45, the chains 38 and cups 45 are vibrated. For this purpose the shaft 52 also extends transversely of the chains 38 in the rear of the plate 37 and has pins 53 secured thereto, carrying small rollers 54, said pins and rollers being in pairs, between which pairs run the chains 38. The pins 53 pass through slots 37a in the plate 37. The shaft 52 carries at its outer end a cam 55 having an uneven waved end surface and a coiled compression spring 56 surrounds shaft 52 and is disposed between the downturned edge of plate 37 and the cam 55, tending to move the shaft and cam outwardly. Another cam member 57 is journaled on the shaft 53 and it also runs in a bearing 58 secured to the side of the hopper 34. Cam 57 has a sprocket 57a formed thereon, the side of which is disposed against the bearing 58. A chain 59 runs over the sprocket 57a and over a sprocket formed on the shaft 27 so that the sprocket 57a is continuously driven.

A pan 60a is disposed below hopper 34 and the chains 38, being carried by bars 60 secured to the bottom of the hopper 34 and the lower member 47.

It is sometimes desired to have some of the chains 38 with the cups 45 inoperative. With the machine having twenty chains, it is sometimes desired to operate only every other chain to deposit in ten of the starch molds. In such cases, a tube or trough 61 is used, these troughs being placed in the hoppers 34 and 36 as shown in Figs. 6 and 9. The trough extends along the upwardly moving run of the chain and covers the chain and cups 45. The tubes 61 rest on the bottom of the hopper 34 and permit the necessary movement of the valves 34c inside of the same. The chain and cups are thus rendered inoperative.

It has been common practice that when the depositor 48 deposits the candy material or fondant from the discharge spouts 49 that a small bit of this material hangs from or drips from the edge of the spouts 49. This small bit often breaks off and falls on to the top of the starch tray of the rear of the mould or drips thereon. This makes an objectionable point or projection on the candy piece.

In accordance with the present invention an air pipe 62 is provided, which extends transversely across the machine in the rear of the discharge spouts 49. This pipe has holes 62a therein directed downwardly at an angle just below the rear edge of the discharge spouts 49. The pipe 62 will be supplied with air from the same source as the pipe 50 and suitable mechanism will be provided so that when the depositor is actuated to deposit the candy, air will be discharged through the opening 62a. This air will blow the small amount of candy material which drips from or tends to hang from the discharge spouts into the moulds 16, so that there will be no objectionable projection or tailing to drop on top of the starch tray.

In operation a supply of cherries, nuts or other articles which it is desired to have embedded in the candy are placed in the hoppers 34 and 36. The ratchet wheel 17 is intermittently rotated by the pawl 18 which is actuated through the lever 19 and arm 23 from the shaft 27. The movement is such that the tray 14 is intermittently moved to bring the rows of molds or depressions 16 successively under the depositing spouts 49 of the depositor 48. The depositor 48 is constructed and arranged to discharge a certain amount of candy material into the molds as the latter are thereunder. When it is desired to feed the cherries or nuts into the molds, the pawl 31 will be thrown into engagement with ratchet 30 and the chain 44 and sprocket 43 will be intermittently moved to intermittently rotate roll 39. The chains 38 and cups 45 are thus intermittently moved through the hoppers 34 and 36. The cups 45 lift the valves 34c as they move into hopper 34 and the nuts or cherries are thus retained in the hopper by the valves when in normal position. As the cups 45 move through the mass of articles in the hoppers, they will receive the same and carry one or more of the articles upwardly. As the cups pass the pipes 51, a blast of air is directed over the same so that if more than one article is carried in the cup, it will be blown off and dropped back into the hopper. The member 57 is constantly rotated by the chain 59 and this member 57, by means of its cam end, longitudinally reciprocates or vibrates the shaft 52. This causes the rollers 54 to vibrate the chains 38 slightly laterally so that a shaking movement is given to the chains and cups 45. This also acts to free the cups of any surplus articles. The cups 45 have their interior roughened or knurled so that more or less of a gripping effect is obtained on the article therein and it is not so easily dislodged therefrom. As the cups pass over the tops of the chains 38, the articles therein are discharged into the chutes 46 and rolled down the same, usually striking against the front end 46b of the chutes. The articles drop through the outlets 46a and into the molds 16. By having the outlets alined with the discharge chutes 49, the articles can be deposited in the molds either before or after the charge of candy is placed therein. This is a great advantage, as it is sometimes desired to place the cherries or nuts in the molds before the candy, and sometimes it is desired to place the same in the molds after the candy has been deposited therein. When it is desired to have the feeding means inoperative, the pawl 31 is merely thrown back out of contact with the ratchet wheel 30 and the chains 38 are then not moved. When the cherries are moved in the hoppers, there may be some leakage of juice from the chains and hoppers and the pan 59 is provided to receive any such leakage, so that the same will not drip onto the starch trays or into the molds where it would be objectionable.

From the above description it is seen that applicant has provided a very simple and efficient feeding device adapted to be used in combination with a candy making machine. The cherries, nuts or other articles to be fed to the molds are singly selected and accurately dropped into the delivery chute 46. By having the two hoppers it is assured that the cups will be filled and will carry an article upward therewith. If an article is not received in the one hopper, it is always received in the second hopper. The molds are thus each provided with one article. If broken nuts or small pieces of nuts are used in the hoppers, several of these pieces may, of course, be carried up by the cups, but where cherries or whole nuts are used, only one piece will be so carried up. As before stated, the machine can be timed so that the nuts or other articles will be dropped either before or after the deposit of candy material. It has largely heretofore been the practice to drop the cherries and nuts by hand, operatives standing at each side of the machine and placing the nuts or cherries in the molds. Applicant's machine thus eliminates the necessity for such operatives. The machine is quite simple in construction, the same has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. The combination with a carrier for trays of starch molds and a depositing apparatus for depositing candy material into said molds having discharge outlets, of a hopper adapted to contain cherries, nuts or similar articles to be placed in said molds, and means having a discharge outlet alined with the discharge outlet of said depositing apparatus for selecting said cherries, nuts or other articles from said hopper and depositing the same in said molds, whereby the same may be deposited either before or after the deposit of the candy material.

2. The combination with a travelling conveyor of a candy making machine, a member having a plurality of rows of molds therein carried by said conveyor, a depositing apparatus having a row of discharge spouts adapted to deposit candy material into a row of said molds, of a feeding device comprising a hopper adapted to contain cherries or other articles to be placed in said molds, a plurality of discharge means having their discharge apertures alined with said discharge spouts and means movable through said hopper for singly selecting articles therefrom and delivering the same to said discharge means whereby a row of said molds may be supplied with said cherries or other articles either before or after being supplied with said candy material.

3. A candy making machine having in combination, an intermittently movable conveyor, a member carried thereby having a plurality of rows of molds therein, a depositing apparatus having a row of discharge outlets adapted to deposit candy material into a row of said molds, of a feeding device comprising a hopper adapted to contain cherries or similar articles to be placed in said molds, a plurality of discharge means having their discharge apertures alined with said discharge outlets and means movable through said hopper for singly selecting articles therefrom and intermittently delivering the same to said discharge means, whereby a row of said molds may be supplied with said cherries or other articles either before or after being supplied with said candy material.

4. The combination with a travelling conveyor of a candy making machine and a member having a plurality of rows of molds therein carried by said conveyor, of an article feeding device comprising a hopper supported adjacent said conveyor adapted to contain the articles to be fed, automatic means comprising a series of members movable through said hopper for singly selecting articles from said hopper and depositing the same into said molds, and means for directing a blast of fluid over said members to remove surplus articles therefrom.

5. The combination with a travelling conveyor of a candy making machine and a member having a plurality of rows of molds therein carried by said conveyor, of an article feeding device comprising a hopper supported adjacent said conveyor adapted to contain the articles to be fed, automatic means comprising a series of members movable through said hopper for singly selecting articles from said hopper and depositing the same into said molds, and means for vibrating said members in said hopper to remove surplus articles therefrom.

6. A device for feeding cherries, nuts or similar articles having in combination, a hopper adapted to contain said articles, an endless member movable through said hopper carrying receptacles adapted to receive articles from said hopper, and means for directing a blast of fluid adjacent said receptacle to remove surplus articles therefrom.

7. A device for feeding cherries, nuts or similar articles having in combination, a hopper adapted to contain said articles, and an endless member movable through said hopper carrying receptacles adapted to receive articles from said hopper, said receptacle having a roughened inner surface.

8. A device for feeding cherries, nuts or similar articles having in combination, a hopper adapted to contain said articles, an endless member movable through said hopper carrying receptacles adapted to receive articles from said hopper, said receptacle being substantially of semi-spherical form and having knurled inner surfaces.

9. A device for feeding cherries, nuts or similar articles having in combination, a hopper having a series of openings in the bottom thereof, swinging valves normally closing said opening, a second hopper disposed within said first mentioned hopper having its bottom disposed above the bottom of said first mentioned hopper and also having a series of openings therein substantially alined with said openings, and a series of endless flexible members passed through said openings and hoppers and having receptacles thereon adapted to receive articles from said hoppers and carry articles singly therefrom, said members lifting said valves as they pass into said first mentioned hopper.

10. A device for feeding cherries, nuts or similar articles having in combination, a hopper having a series of openings in the bottom thereof, swinging valves normally closing said openings, a second hopper disposed within said first mentioned hopper having its bottom disposed above the bottom of said first mentioned hopper and also having a series of openings therein substantially alined with said openings, whereby said last mentioned hopper communicates with said first mentioned hopper, a series of endless chains passing through the openings in both hoppers and through said hoppers, a series of cups carried by each of said chains and means for intermittently moving said chains and cups through said hoppers.

11. A device for feeding cherries, nuts or similar articles, having in combination, a hopper, a series of endless members moving through said hopper, receptacles carried on each of said endless members adapted to receive and carry articles from said hopper, and a cover member adapted to be disposed in said hopper over one of said chains to prevent any articles being picked up thereby.

12. The structure set forth in claim 11, means for vibrating said endless member and receptacle while passing through said hoppers, and means for directing a blast of fluid over said receptacles for removing surplus articles therefrom.

13. The combination with a carrier for trays of starch moulds and a depositing apparatus for depositing candy material into said moulds having discharge spouts, of a conduit disposed adjacent the ends of said discharge spouts, and having means for directing a blast of air beneath the edge of said discharge spouts to prevent any tailings from said spouts dripping in the rear of said moulds.

14. The combination with a travelling carrier of a candy making machine, a member having a plurality of rows of molds therein carried by said conveyor, a depositing apparatus for depositing candy material into said molds, a feeding apparatus for depositing cherries or other articles in said molds alined with said means for depositing said candy, means for positioning said conveyor with a row of the molds under said depositing apparatus and feeding device, and means for operating said depositing apparatus and feeding device so that candy material and articles are deposited in a row of said molds while in one position.

15. A device for feeding cherries, nuts or similar articles having in combination, a hopper adapted to contain said articles, an endless member movable through said hopper carrying receptacles adapted to receive articles from said hopper and movable power actuated means for vibrating said member and receptacles to remove surplus articles therefrom.

In testimony whereof I affix my signature.

FRANK M. SCHULER.